United States Patent [19]

Kawashima et al.

[11] Patent Number: 4,963,887

[45] Date of Patent: Oct. 16, 1990

[54] FULL DUPLEX TRANSPONDER SYSTEM

[75] Inventors: Yoshikazu Kawashima; Ko Ishikawa, both of Kanagawa; Shinichi Haruyama, Gunma; Fusao Sekiguchi, Tokyo, all of Japan

[73] Assignees: Yamatake-Honeywell Co., Ltd.; Yokowo Mfg. Co., Ltd., both of Tokyo, Japan

[21] Appl. No.: 399,869

[22] Filed: Aug. 29, 1989

[30] Foreign Application Priority Data

Aug. 31, 1988 [JP] Japan .................. 63-217482

[51] Int. Cl.⁵ .................. H01R 39/00
[52] U.S. Cl. .................. 342/44; 342/42
[58] Field of Search .................. 342/42, 44, 45, 51

[56] References Cited

U.S. PATENT DOCUMENTS

| | | |
|---|---|---|
| 2,734,954 | 2/1956 | Kidd . |
| 3,145,380 | 8/1964 | Currie . |
| 3,270,330 | 8/1966 | Weinberg . |
| 3,427,614 | 2/1969 | Vinding . |
| 3,631,484 | 7/1969 | Augenblick . |
| 3,689,885 | 9/1972 | Kaplan et al. . |
| 3,745,569 | 7/1973 | Works et al. . |
| 3,754,250 | 8/1973 | Bruner . |
| 3,781,879 | 12/1973 | Staras et al. . |
| 3,859,624 | 1/1957 | Kriofsky et al. . |
| 4,015,259 | 3/1977 | Siverhus . |
| 4,019,181 | 4/1977 | Olsson et al. . |
| 4,068,232 | 1/1978 | Meyers et al. . |
| 4,075,632 | 2/1978 | Baldwin et al. . |
| 4,177,466 | 12/1979 | Reagan . |
| 4,314,373 | 2/1982 | Sellers . |

FOREIGN PATENT DOCUMENTS

| | | |
|---|---|---|
| 1696245 | 1/1972 | Fed. Rep. of Germany . |
| 2524571 | 6/1975 | Fed. Rep. of Germany . |
| 2508201 | 9/1976 | Fed. Rep. of Germany . |
| 3143915 | 5/1983 | Fed. Rep. of Germany . |
| 51-35911 | 3/1976 | Japan . |
| 56-140486 | 11/1981 | Japan . |
| 61-39946 | 2/1986 | Japan . |
| 63-54023 | 3/1988 | Japan . |

Primary Examiner—Thomas H. Tarcza
Assistant Examiner—Mark Hellner
Attorney, Agent, or Firm—Blakely, Sokoloff, Taylor & Zafman

[57] ABSTRACT

A full duplex transponder system includes an interrogation apparatus and a transponder apparatus. The transponder apparatus includes a reception antenna for receiving an interrogation signal wave whose carrier wave is phase- or frequency-modulated with an interrogation signal, a demodulator for demodulating the interrogation signal from the interrogation signal wave received by the antenna, a rectifier for rectifying the carrier wave of the interrogation signal wave received by the antenna and outputting a DC power used as a drive power source of the transponder apparatus, a multiplier for generating a predetermined harmonic component from the carrier wave of the interrogation signal wave received by the antenna, a modulator for amplitude-modulating the harmonic component with a response signal, and a transmission antenna for transmitting a response signal wave output from the modulator. The interrogation apparatus includes an oscillator for generating the carrier wave, a modulator for phase- or frequency-modulating the carrier wave generated by the oscillator with an interrogation signal, a transmission antenna for transmitting an interrogation signal wave output from the modulator, a reception antenna for receiving the response signal wave output from the transmission antenna of the transponder apparatus, and a demodulator for demodulating the response signal from the response signal wave received by the reception antenna.

2 Claims, 3 Drawing Sheets

FULL DUPLEX TRANSPONDER SYSTEM

BACKGROUND OF THE INVENTION

The present invention relates to a full duplex transponder system in which interrogation is performed from a fixed interrogation apparatus to a moving unit to be interrogated by using a radio wave, and a transponder apparatus of the moving unit responds to this interrogation.

In recent years, the following transponder system has been proposed. In this transponder system, a transponder apparatus is carried by a user or attached to a moving unit. For example, proper data of the user or the moving unit is stored in the transponder apparatus. An interrogation signal is transmitted from a fixed interrogation apparatus to the transponder apparatus using a microwave, and the transponder apparatus which receives the interrogation signal transmits a proper response signal to the interrogation apparatus using the microwave. The interrogation apparatus verifies the received response signal by a proper means, and hence the user or the moving unit can be identified. In accordance with personal data stored in the transponder apparatus, the transponder apparatus can be used as an ID card or a driver's license. On the other hand, assume that, in, e.g., a manufacturing factory for producing various types of products in small quantities, a transponder apparatus which stores specification data is attached to a semi-product on a manufacturing line. If the specification is interrogated from an interrogation apparatus to the transponder apparatus during each process, and an operation is performed in accordance with this specification, the transponder apparatus can be used as an electronic specification instruction.

A system constituted by the above-described transponder apparatus and interrogation apparatus is disclosed in Japanese Pat. Laid-Open (Kokai) Nos. 51-35911 and 56-140486.

According to the technique disclosed in Japanese Pat. Laid-Open (Kokai) No. 51-35911, an interrogation apparatus transmits a pulse-like interrogation signal wave obtained by modulating a carrier wave with an interrogation signal to a transponder apparatus. Upon reception of this interrogation signal wave, the transponder apparatus obtains a DC power from the carrier wave of the interrogation signal wave, and at the same time generates a second harmonic component so as to cause a resonator to resonate it. The second harmonic component is amplitude-modulated with a response signal within a period in which this pulse-like second harmonic component continues. The modulated second harmonic component is transmitted to the interrogation apparatus as a response signal wave.

According to the technique disclosed in Japanese Pat. Laid-Open (Kokai) No. 56-140486, an interrogation apparatus transmits a pulse-like interrogation signal wave obtained by modulating a first carrier wave with an interrogation signal to a transponder apparatus, and at the same time transmits an energy wave obtained by amplitude-modulating a second carrier wave with a response signal carrier wave thereto. The transponder apparatus obtains a DC power from the received energy wave and demodulates the response signal carrier wave. The transponder apparatus then transmits a pulse-like response signal wave obtained by modulating the response signal carrier wave with a response signal to the interrogation apparatus. Alternatively, the interrogation apparatus transmits an interrogation signal wave obtained by modulating a first carrier wave with an interrogation signal and a response signal carrier wave to the transponder apparatus. The transponder obtains the interrogation signal, a DC power, and the response signal carrier wave from the received interrogation signal wave.

In the technique disclosed in Japanese Pat. Laid-Open (Kokai) No. 51-35911, since a second harmonic component obtained from a pulse-like carrier wave is resonated by the resonator and used as a carrier wave of a response signal wave, transmission of the response signal wave can be performed only within a period in which a pulse-like interrogation signal wave is transmitted. In the technique disclosed in Japanese Pat. Laid-Open (Kokai) No. 56-140486, the interrogation apparatus must transmit a response signal carrier wave to the transponder apparatus, and hence an oscillator for response signal carrier waves is required.

In order to eliminate such drawbacks, the following system has been proposed. In this system, an interrogation apparatus transmits a pulse-like interrogation signal wave obtained by modulating a first carrier wave with an interrogation signal and a non-modulated second carrier wave as an energy wave to a transponder apparatus. The transponder apparatus obtains a DC power from the received energy wave, and at the same time generates a second harmonic component. The transponder apparatus then modulates the second harmonic component with a response signal to form a pulse-like response signal wave, and transmits the response signal wave to the interrogation apparatus. FIG. 1 is a block diagram of such a communication system, which will be described in detail below.

Referring to FIG. 1, an interrogation apparatus 1 includes a first oscillator 2 for oscillating a first frequency $f_1$ in a microwave band (e.g., 2,440 MHz), and a second oscillator 3 for oscillating a second frequency $f_2$ (e.g., 2,455 MHz) slightly different from the frequency $f_1$. The first frequency $f_1$ output from the first oscillator 2 is amplified by an amplifier 4. Thereafter, the first frequency $f_1$ is transmitted by, for example, vertical polarization from an antenna 5 to a transponder apparatus 6 as a non-modulated energy wave using the first frequency $f_1$ as a carrier wave. In addition, the second frequency $f_2$ output from the second oscillator 3 is A1-modulated with an interrogation signal by a modulator 7 and is amplified by an amplifier 8. Thereafter, the second frequency $f_2$ is transmitted by horizontal polarization from an antenna 9 to the transponder apparatus 6 as an interrogation signal wave using the second frequency $f_2$ as a carrier wave. The interrogation apparatus 1 further includes an antenna 10 for receiving a response signal wave using a second harmonic component $2f_1$ of the first frequency $f_1$ transmitted from the transponder apparatus 6 as a carrier wave. A response signal is demodulated from the response signal wave received by the antenna 10 through a bandpass filter 11, a low noise block down converter 12, and a detector 13. Note that a microprocessor and the like (not shown) are incorporated in the interrogation apparatus 1 so as to discriminate whether a demodulated response signal is proper with respect to an interrogation signal, or to output an operation signal for performing processing in accordance with a response signal.

The transponder apparatus 6 includes an antenna 14 for receiving an energy wave transmitted from the antenna 5. An energy wave received by the antenna 14 is converted into a DC power +B through a rectifier 15 and a low-pass filter 16 and is output. This DC power is used as a drive power source of the transponder apparatus 6. In addition, the energy wave received by the antenna 14 is converted into a second harmonic component $2f_1$ by a multiplier 17 constituted by a diode and the like, and is supplied to a modulator 19 through a bandpass filter 18 as a carrier wave of a response signal wave. The second harmonic component $2f_1$ is A1-modulated with a response signal by the modulator 19, and is transmitted from an antenna 20 to the interrogation apparatus 1 as a response signal wave. The transponder apparatus 6 further includes an antenna 21 for receiving an interrogation signal wave transmitted from the antenna 9. An interrogation signal is demodulated from an interrogation signal wave received by the antenna 21 through a detector 22, a high-pass filter 23, and an amplifier 24. Note that a microprocessor and the like (not shown) are incorporated in the transponder apparatus 6 so as to store proper data and to calculate a proper response signal in accordance with a demodulated interrogation signal.

In the above-described communication system, since an energy wave from the interrogation apparatus 1 is received by the transponder apparatus 6, a second harmonic component as a carrier wave of a response signal wave can always be generated. Therefore, an interrogation signal wave and a response signal wave are simultaneously transmitted from the interrogation apparatus 1 and the transponder apparatus 6, respectively, thus enabling so-called full duplex communication. However, the interrogation apparatus 1 requires the first oscillator 2 for oscillating a first frequency $f_1$ as a carrier wave of an energy wave, and the second oscillator 3 for oscillating a second frequency $f_2$ as a carrier wave of an interrogation signal wave. In addition, the interrogation apparatus 1 requires the antennas 5 and 9 for respectively transmitting an energy wave and an interrogation signal wave, and at the same time requires an antenna for receiving an interrogation signal wave. Moreover, the transponder apparatus 6 requires the antennas 14 and 21 for respectively receiving an energy wave and an interrogation signal wave, and at the same time requires the antenna 20 for transmitting a response signal wave. Therefore, the interrogation apparatus 1 and the transponder apparatus 6 inevitably have complex arrangements. Especially, since the transponder apparatus 6 requires the three antennas 14, 20, and 21, its miniaturization is interfered.

SUMMARY OF THE INVENTION

It is, therefore, a principal object of the present invention to provide a transponder system which can perform full duplex communication with a simple arrangement.

It is another object of the present invention to provide a transponder system having a small, lightweight transponder apparatus.

It is still another object of the present invention to provide a transponder system having a transponder apparatus which is stably operated.

In order to achieve the above objects, there is provided a full duplex transponder system in which interrogation is performed from an interrogation apparatus to a moving unit to be interrogated by using a radio wave, and a transponder apparatus of the moving unit responds to the interrogation, the transponder apparatus comprising, reception antenna means for receiving an interrogation signal wave whose carrier wave is phase- or frequency-modulated with the interrogation signal, demodulating means for demodulating the interrogation signal from the interrogation signal wave received by the antenna means, rectifying means for rectifying the carrier wave of the interrogation signal wave received by the antenna means and outputting a DC power used as a drive power source of the transponder apparatus, multiplying means for generating a predetermined harmonic component from the carrier wave of the interrogation signal wave received by the antenna means, modulating means for amplitude-modulating the harmonic component with a response signal, and transmission antenna means for transmitting a response singal wave output from the modulating means, and the interrogation apparatus comprising, oscillating means for generating the carrier wave, modulating means for phase- or frequency-modulating the carrier wave generated by the oscillating means with an interrogation signal, transmission antenna means for transmitting an interrogation signal wave output from the modulating means, reception antenna means for receiving the response signal wave output from the transmission antenna means of the transponder apparatus, and demodulating means for demodulating the response signal from the response signal wave received by the reception antenna means.

DETAILED DESCRIPTION OF THE PREFERRED EMBODIMENT

Figure 1:
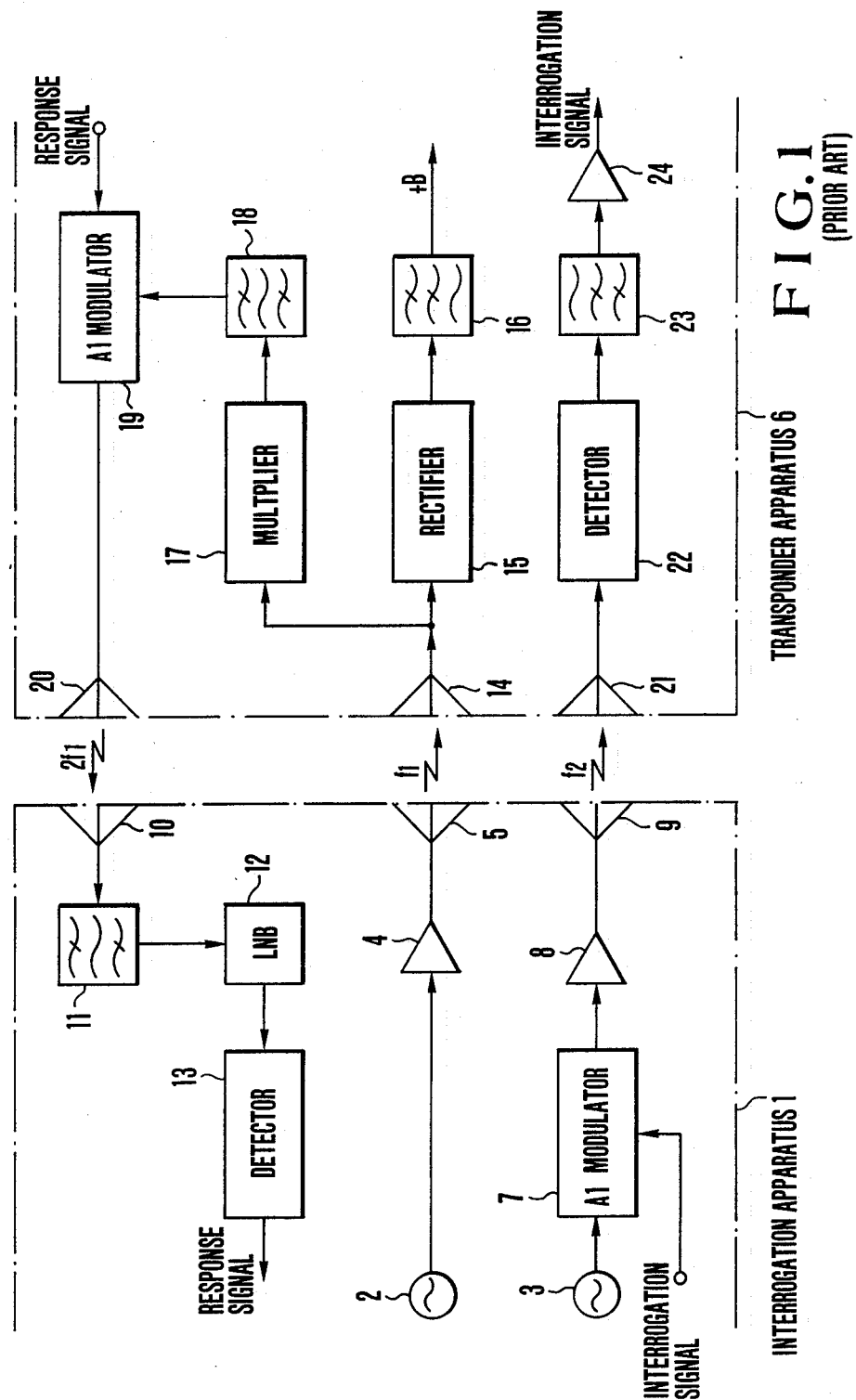
FIG. 1 is a block diagram showing a conventional full duplex transponder system.
Figure 2:
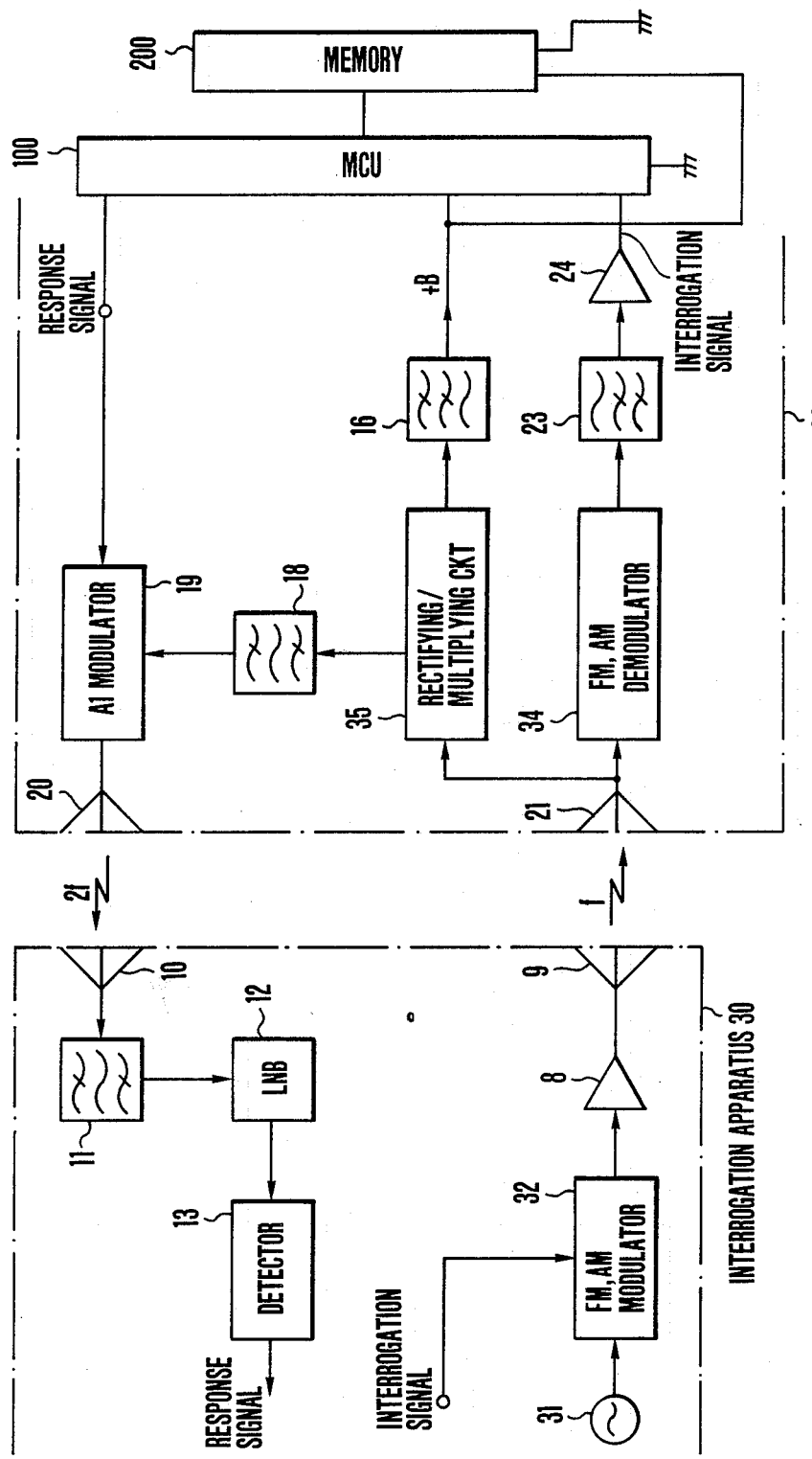
FIG. 2 is a block diagram showing a full duplex transponder system according to an embodiment of the present invention.

FIG. 2 shows a full duplex transponder system according to an embodiment of the present invention. The same reference numerals in FIG. 2 denote the same parts or parts having the same functions as in FIG. 1. Referring to FIG. 2, a fixed interrogation apparatus 30 includes an oscillator 31 as an oscillating means for oscillating a frequency f in a microwave band (e.g., 2,440 or 2,455 MHz) as in FIG. 1. A frequency f output from this oscillator is phase- or frequency-modulated by a phase or frequency modulator 32 as a modulating means with an interrogation signal. The frequency f is then amplified by an amplifier 8 and is transmitted from an antenna 9 as a transmission antenna means to a transponder apparatus 33 as an interrogation signal wave using the frequency f as a carrier wave. The interrogation signal used in this case is constituted by, e.g., a coded pulse signal as shown in FIG. 2A, and includes an instruction such as a read, write, or erase instruction, an address signal for accessing a memory of the transponder apparatus, and data. Similar to the interrogation apparatus shown in FIG. 1, the interrogation apparatus 30 includes an antenna 10 as a reception antenna means for receiving a response signal wave using a second harmonic component 2f of a frequency f transmitted from the transponder apparatus 33 as a carrier wave, and a bandpass filter 11, a low noise block down converter 12, and a detector 13 as a demodulating means. A response signal is demodulated from a response signal wave received by the antenna 10.

The interrogation apparatus 33 includes an antenna 21 as a reception antenna means for receiving an interrogation signal transmitted from the antenna 9. An interrogation signal wave received by the antenna 21 is supplied to a phase or frequency demodulator 34 as a demodulating means and to a rectifying/multiplying circuit 35 serving as both a rectifying means and a multiplying means. An interrogation signal demodulated by the phase or frequency demodulator 34 is output to a microprocessor 100 through a high-pass filter 23 and an amplifier 24. The microprocessor 100 generates a response signal by properly accessing a memory 200 in accordance with the demodulated interrogation signal.

Figure 4:
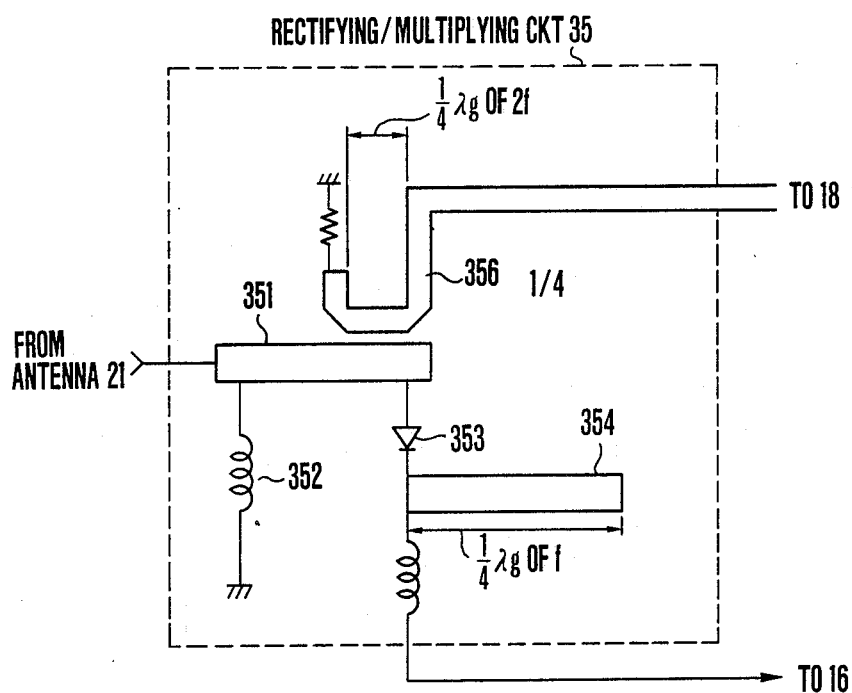
FIG. 4 is a circuit diagram showing a rectifying/multiplying circuit in FIG. 1.

The rectifying/multiplying circuit 35 rectifies a carrier wave of an interrogation signal wave and outputs a DC power +B through a low-pass filter 16. The circuit 35 is constituted by a diode and the like, and also generates second and third harmonic components upon rectification. FIG. 4 shows the circuit 35 in detail. Referring to FIG. 4, reference numeral 351 denotes strip line having a suitable length. One end of the strip line 351 is connected to the antenna 21. One end of a coil 352 as a low-pass filter is grounded, and the other end thereof is connected near one end of the strip line 351. The anode of a diode 353 having a rectifying/multiplying function is connected near the other end of the strip line 351, and its cathode is connected to one end of a strip line 354 having a length of $\lambda g/4$ of a used frequency f. This strip line 354 is operated to cause an impedance at the cathode side of the diode 353 to become zero and extract a large current. In addition, a J-shaped directional coupler 356 is arranged near the strip line 351. A reflectionless termination unit 357 is connected to the distal end of the directional coupler 356. In this case, the length of that part of the directional coupler 356 which is parallel to the strip line 351 is set to be $\lambda g/4$ which is twice the used frequency f so as to extract a multiple output. A second harmonic component output from the circuit 35 is filtered by a bandpass filter 18 and is supplied as a carrier wave having a frequency 2f to a modulator 19 as a modulating means. A second harmonic component 2f is A1-modulated with a response signal supplied from the microprocessor 100 and is transmitted as a response signal wave from the antenna 20 as a transmission antenna means to the interrogation apparatus 30 in the same manner as in FIG. 1.

Figure 3A:
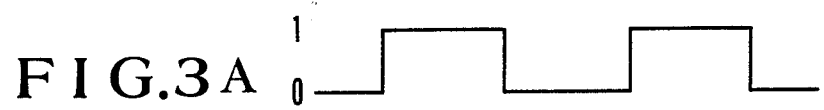
FIGS. 3A to 3D are timing charts showing an interrogation signal wave and a response signal wave in FIG. 1.
Figure 3B:
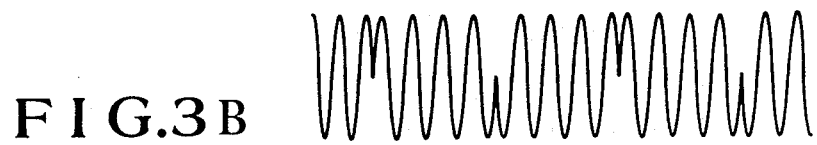
Figure 3C:
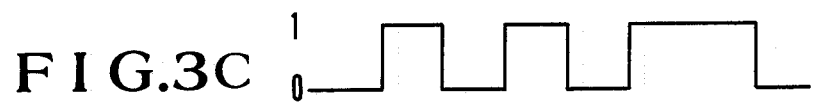
Figure 3D:
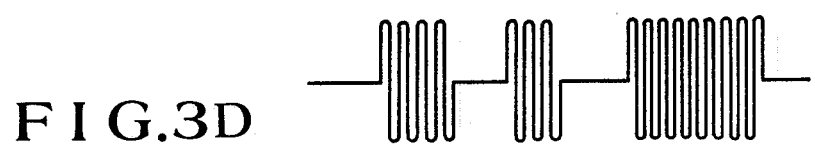

With this arrangement, an interrogation signal wave shown in FIG. 3B is transmitted from the interrogation apparatus 30 to the transponder apparatus 33. This interrogation signal wave is obtained by phase-modulating a carrier wave having a frequency f with a digital signal as an interrogation signal shown in FIG. 3A. As shown in FIG. 3B, the interrogation signal wave has a substantially constant amplitude, and hence a DC power obtained by the rectifying/multiplying circuit 35 is substantially constant. In addition, the power of a second harmonic component 2f generated upon rectification by the circuit 35 is substantially constant. This second harmonic component is A1-modulated by the modulator 19 with a digital signal (FIG. 3C) as a response signal transmitted from the microprocessor 100, and is transmitted as a response signal wave shown in FIG. 3D from the antenna 20 to the interrogation apparatus 30. Since a second harmonic component 2f is generated from a phase- or frequency-modulated interrogation signal wave, the second harmonic component 2f is phase- or frequency-modulated. Therefore, a carrier wave of a response signal wave is phase- or frequency-modulated. However, since a response signal wave received by the interrogation apparatus 30 is envelope-detected by the detector 13, a response signal can be reliably demodulated regardless of phase or frequency modulation.

Therefore, an interrogation signal wave and a response signal wave can be simultaneously transmitted from the interrogation apparatus 30 and the transponder apparatus 33, respectively, thus enabling full duplex communication. Information exchange can be quickly performed between the interrogation apparatus 30 and the transponder apparatus 33.

Note that in the above-described embodiment, instead of phase modulation (PM) and frequency modulation (FM), phase-shift keying (PSK) and frequency-shift keying (FSK) may be performed for phase or frequency modulation. In addition, modulation of a response signal wave is not limited to A1 modulation but any other modulation may be employed as long as amplitude modulation is performed.

Since the present invention has the above-described arrangement, the following effects can be obtained.

Simultaneously with reception of an interrogation signal wave, the transponder apparatus can transmit a response signal wave with a simple arrangement. In addition, the carrier wave of the interrogation signal wave has a substantially constant amplitude, and hence the interrogation signal wave can be transmitted using a constant power. Furthermore, since the transponder apparatus requires only one reception antenna means capable of receiving an interrogation signal wave, its arrangement can be simplified, and at the same time the area of a space for installing the reception antenna means can be reduced. Therefore, the transponder apparatus can be reduced in size and weight accordingly. In spite of the fact that a DC power is obtained from an interrogation signal wave by using the rectifying means, a statle DC power can be obtained, and the transponder apparatus can be stably operated.

In addition, since the interrogation apparatus requires only one oscillating means for oscillating the carrier wave of an interrogation signal wave, its arrangement can be simplified.

Moreover, since full duplex communication can be performed between the transponder apparatus and the interrogation apparatus, information exchange therebetween can be quickly performed.

What is claimed is:

1. A full duplex transponder system in which interrogation is performed from an interrogation apparatus to a moving unit to be interrogated by using a radio wave, and a transponder apparatus of the moving unit responds to the interrogation, said transponder apparatus comprising:
reception antenna means for receiving an interrogation signal wave whose carrier wave is phase- or frequency-modulated with the interrogation signal,
demodulating means for demodulating the interrogation signal from the interrogation signal wave received by said antenna means,
rectifying means for rectifying the carrier wave of the interrogation signal wave received by said antenna means and outputting a DC power used as a drive power source of said transponder apparatus, multiplying means for generating a predetermined harmonic component from the carrier wave of the interrogation signal wave received by said antenna means, modulating means for amplitude-modulating the harmonic component with a response signal, and transmission antenna means for transmitting a response singal wave output from said modulating means; and said interrogation apparatus comprising:

oscillating means for generating the carrier wave, modulating means for phase- or frequency-modulating the carrier wave generated by said oscillating means with an interrogation signal, transmission antenna means for transmitting an interrogation signal wave output from said modulating means, reception antenna means for receiving the response signal wave output from said transmission antenna means of said transponder apparatus, and demodulating means for demodulating the response signal from the response signal wave received by said reception antenna means.

2. A system according to claim 1, wherein the harmonic component is a second harmonic component.

* * * * *